3,296,144
REMOVAL OF STAINS FROM POLYMERIC MATERIALS, PARTICULARLY VINYL PLASTICS
Roy A. White, Somers, Conn., assignor to Kimball Systems, Inc., a corporation of Delaware
No Drawing. Filed Dec. 18, 1963, Ser. No. 331,376
16 Claims. (Cl. 252—91)

This invention relates to the removal of stains and is especially concerned with the removal of subsurface stains from polymeric materials, particularly vinyl plastics.

Most superficial stains can be removed by dissolving, emulsifying, or oxidizing the material causing the stain. Conventional stain removers are not suitable for polymeric plastics such as vinyl plastics, however, because in most cases the material causing the stain dissolves in the polymer and/or in the plasticizer and migrates into the interior of the plastic where it is not affected by conventional surface stain removers.

The principal object of this invention is to provide for effective removal of stains from polymeric materials, for instance in the form of textiles and substrates including plastic sheet materials and foams. It is another object of this invention to provide a stain remover which is effective to remove most commonplace household stains from polymeric material without adversely affecting the material.

The above and other objects and advantages of this invention will be more readily apparent from the following description.

In accordance with this invention it has been found that the borane derivatives are highly effective for removing, from polymeric material, stains caused by inks, lipsticks, various foods, beverages, cigarettes and other materials commonly the cause of stains on furniture, clothing, flooring, etc.

In its broadest aspects, the present invention is based upon the utilization, for the removal of, or the lightening of, stains from polymeric materials by the application to the stain of a borane compound. As used in the specification and claims, unless otherwise specifically defined, the term "borane" is employed generically to encompass amine boranes (containing the borane group $BH_3$) and alkali metal and quaternary ammonium borohydrides (containing the borohydride group $BH_4$). Where reference is made to the removal of stains, it will be understood to encompass complete or partial removal of the stains (partial removal meaning a lightening of the color of the stain) unless the context specifically indicates otherwise.

The boranes may be represented by the following general formulae:

(I)   $R_3N:BH_3$ where $R_3N$ is a primary, secondary or tertiary amine;

(II)   $MBH_4$ where M is an alkali metal, such as sodium, potassium or lithium, or M can be a quaternary ammonium radical illustrated by the formula

where $R^1$, $R^2$, $R^3$ and $R^4$ are the same or different hydrocarbon radicals, particularly lower molecular weight alkyl radicals such as methyl, ethyl, propyl, isopropyl, butyl, isobutyl, although other hydrocarbon radicals such as benzyl, cyclohexyl, nonyl, dodecyl, tetradecyl, hexadecyl and octadecyl can be present.

The boranes which are represented by formula (I), to wit, the amine boranes, may be selected from a large number. As stated previously, they may be tertiary amine boranes, diamine boranes or monoamine boranes, these subsidiary groups being represented by the following formulae:

(III)   $R_3N:BH_3$ (tertiary amine boranes)

where $R_3N$ is a tertiary amine.

(IV)   $R_2NH:BH_3$ (secondary amine boranes)

where $R_2NH$ is a secondary amine.

(V)   $RNH_2:BH_3$ (primary amine boranes)

where $RNH_2$ is a primary amine.

Illustrative examples of such amine boranes are monoethyl amine borane, dimethyl amine borane, trimethyl amine borane, monoethyl amine borane, diethyl amine borane, triethylamine borane, mono-, di- and tri-propyl amine boranes, mono-, di- and tri-isopropyl amine boranes, mono-, di- and tri-butyl amine boranes, mono-, di- and tri-isobutyl amine boranes, monoethanolamine borane, diethanolamine borane, ethylenediamine borane, benzyl amine borane, dodecyl amine borane, morpholine borane, cyclohexyl amine borane, and the like. In the particularly preferred embodiments of the present invention, the pyridine boranes are utilized. Such pyridine boranes comprise pyridine borane itself, or the pyridine ring may be substituted with hydrocarbon radicals, particularly lower molecular weight alkyl radicals. Such pyridine boranes can be represented by the general formula

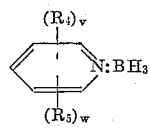

where $R_4$ and $R_5$ are hydrocarbon radicals, notably alkyl radicals and particularly lower alkyl radicals such as methyl, ethyl, propyl, isopropyl, butyl and isobutyl, and $v$ and $w$ are each zero or 1. Among the substituted pyridine boranes are methyl pyridine borane, dimethyl pyridine borane, ethyl pyridine borane, diethyl pyridine borane; propyl-, isopropyl-and butyl-pyridine boranes; and dipropyl-, di-isopropyl- and dibutyl pyridine boranes. In place of the pyridine boranes, boranes of other heterocyclic amines and aromatic amines can be used such as boranes of quinaldine, piperidine, methyl piperidine, pyrrolidine, aniline, and benzyl amine. However, the particularly preferred amine boranes are, generally speaking, pyridine borane, dimethylamine borane, and the butylamine boranes.

Among those boranes which fall within Formula II above, sodium borohydride, tetramethyl ammonium borohydride, tetraethyl ammonium borohydride, tetra-isopropyl ammonium borohydride, and benzyl trimethyl ammonium borohydride are illustrative examples.

For use in the practice of the present invention, the boranes should preferably be in liquid form or dissolved in a suitable solvent system and should be soluble in the polymer and/or in plasticizers, for instance, dioctyl phthalate, of the polymeric material for which they are to be used to remove stains. This solubility characteristic of the boranes selected permits the boranes to migrate into the body of the plastic to combine and/or react with the staining material.

Superficial stains are removed by dissolving, emulsifying or oxidizing the staining material so that it can be washed or wiped from the surface of the material stained. A completely different approach, however, is needed to remove stains which have migrated into the plastic. Since stains in plastics such as vinyl polymers result from dissolution of the staining matter in the polymer and/or the liquid plasticizer, the stain removers, to function effectively, should possess the property of reasonable solubility in the polymer and/or the plasticizer and compatibility with the polymer and plasticizer. A further requisite of a stain remover from polymeric materials is a chemical affinity or reactivity with the staining material and preferably with a number of the most commonplace stains. Moreover, in its particularly preferred embodiments, the resulting product must be colorless. It has been found that boranes possess these requisite properties.

It has been discovered, pursuant to the present invention, that many stains are readily removed using only a dilute solution of a borane, for instance, pyridine borane or the vapor of the pyridine borane. Some difficult-to-remove stains, however, require the application of the borane at full strength. In certain cases, it was found that pure pyridine borane sometimes causes undue swelling of the polymeric material and tends to result in a marred surface appearance. The present invention provides procedures for overcoming this difficulty so that boranes, such as pyridine borane, can be applied without swelling or marring the polymeric material, for instance, a vinyl plastic.

The following examples are illustrative of various embodiments of the practice of the present invention and, since various changes may be made in the light of the guiding principles and teachings contained herein, it will be understood that they are not to be construed in any way as limitative of my invention.

Example 1

A polyvinyl chloride plastic was stained with a triphenylmethane dye (Victoria Blue). A dilute solution of pyridine borane in methanol was applied to the blue stained plastic. The stain was completely removed without harmful effect on the plastic.

Example 2

(a) A standard vinyl sheet, the composition of which comprised, in terms of parts by weight, 100 parts polyvinyl chloride (Goodrich Geon 101–EP), 50 parts dioctyl phthalate, 5 parts titanium pigment (Titanox RA–10 TiO$_2$) and 1 part organotin stabilizer (Metal & Thermit Thermolite 31), was selected. It was then soaked for 1 hour in full strength pyridine borane to diffuse said borane uniformly into the body of the sheet.

(b) A piece of the thus soaked or impregnated polyvinyl chloride sheet was then placed against a badly stained area of a sheet of polyvinyl chloride plastic. The stain was removed completely in 24 hours without any adverse effect on the polyvinyl chloride sheet such as tended to occur when full strength borane was applied directly to the stained sheet. This procedure, using borane impregnated stain removing sheets or patches, is ideally suited for removing stains from badly stained plastics without injury to the plastic.

Example 3

A rigid polyvinyl chloride sheet was soaked in pure pyridine borane for 7 hours at room temperature followed by a 3-hour immersion at 100 degrees C. On removal, the vinyl sheet was soft and limp having been plasticized solely by pyridine borane. The limp, borane-plasticized sheet was then pressed against a standard vinyl sheet, as disclosed in part (a) of Example 2, but deeply stained by spaghetti sauce; the stain was removed completely without injuring the vinyl sheet.

Example 4

A plastisol was prepared consisting of 100 parts polyvinyl chloride plastisol resin, 50 parts dioctyl phthalate and 50 parts pyridine borane, said parts being by weight. This preparation, in the form of a paste, was spread on aluminum foil and fused at 138 degrees C. forming a strong flexible vinyl film in which the plasticizer was the mixture of dioctyl phthalate and pyridine borane. The film was tested by pressing against a standard vinyl sheet, as referred to in part (a) of Example 2, which had been stained by lipstick and spaghetti sauce. Both stains were completely removed after 4 days of treatment. This test was conducted at room temperature. At an elevated temperature, stain removal could be accomplished in a much shorter time. Thus, at 60 degrees C., comparable stain removal results were obtained in 1 to 2 hours without swelling or marring of the surface of the plastic sheet.

Example 5

2 grams of vinyl chloride plastisol resin and 1 gram of pyridine borane were mixed to form a paste. This mixture was spread on aluminum foil and fused to form a coating. This was done by using a hot air blast from a heat gun. Cloth-backed white plasticized vinyl foam previously stained with lipstick was pressed against the coating, followed by a hot water rinse. This produced almost complete removal of the stain. The coating was then pressed against the slightly stained foam for 20 minutes in a 60 degrees C. oven, the foam becoming completely white, without marring the surface.

Example 6

The same foam used in Example 5 was stained with Parker T-Ball Blue Ballpoint pen ink, and the borane plasticized resin was pressed against the stained foam for 5 minutes at room temperature. Removal of the stain was complete, without marring the surface.

Since various triphenylmethane dyes are safe for human consumption and are, therefore, widely used as coloring agents in foods, beverages and cosmetics, a number of additional examples was carried out wherein triphenylmethane dyes were treated with a 4% solution of pyridine borane in methanol. Other commercial dyes were similarly treated. Example 7 shows, in table form, the effects obtained.

Example 7

| Dye | Type | Removal of Color |
|---|---|---|
| Malachite Green Oxalate | Triphenylmethane | Complete in 30 minutes. |
| Leeben Color & Chemical Red 13582 | do | Do. |
| Sterwin Chemical Parakeet FD&C Blue #1 | do | Do. |
| Sterwin Chemical Parakeet FD&C Blue #1 Lake | do | Do. |
| General Dyestuff Violamine RD CF | Xanthene-Phthalein | Complete in 24 hours. |
| Rhodamine B | Xanthene | Partial in 78 hours. |
| National Aniline Sulfur Brilliant Orange GR | Sulfur | Poor at 74 hours. |
| General Dyestuff Sudan Orange RA | Azo Phenol | Poor. |
| Aminoazobenzene Hydrochloride | Azo Amine | Do. |
| Ciba Blue 2-BDM C.I. Vat Blue 5 | Indigo Vat Dye | Do. |
| Ciba Cibalan Bordeaux RL C.I. Acid Violet 71 | Cationic | Do. |
| Proflavine | Acridine | Do. |

As is evident, pyridine borane removes the color of triphenylmethane dyes very readily, but, in contrast, has little or no effect on most other types. Hence, pyridine borane can be safely used on materials containing various other dyes as coloring agents.

Example 8

A variety of inks of the ballpoint types were applied to the surface of standard white plasticized vinyl sheet, as disclosed in part (a) of Example 2, and allowed to soak into the vinyl sheet for 16 hours. The surface was then wiped clean with isopropanol, leaving stain within the interior of the vinyl sheet. The ink stains were first treated with a 1% solution of pyridine borane dissolved in isopropanol. After evaporation of the solvent, the stain removal effect was observed. In cases where the dilute solution was inadequately effective, pure pyridine borane was then used on the stained sheet and allowed to soak in. The results of the tests are as follows:

| Ink | Stain | Stain Removal Results by Pyridine Borane | |
|---|---|---|---|
| | | 1% solution | Pure |
| Fisher Blue Ballpoint | Deep Blue | Green-Yellow/1 day | White/2 hours. |
| Papermate Blue Ballpoint | Light Pink/Light Blue | Light Orange/1 day | Do. |
| Parker T-Ball Blue Ballpoint | Purple | White/2 hours | |
| Scripto 700 Blue Ballpoint | Red | Slight | Do. |
| Scripto Tele-Gauge Blue Ballpoint | Greenish-Purple | Yellow/1 day | White/1 day. |
| Waterman SLC-1 Blue Ballpoint | Purple | White/2 hours | |

Example 9

The effects of the boranes on various types of lipstick were also tested. The various lipsticks were smeared on the standard white plasticized vinyl sheet described above and left 16 hours to allow the stain to set. The surface was wiped clean with isopropanol, leaving an internal stain on the sheet. The stain was treated with a 1% solution of pyridine borane in isopropanol; where the dilute solution was inadequately effective, pure pyridine borane was used with the results tabulated below:

Example 11

The effectiveness of the stain removers embodying the present invention was tested on cigarette stains which, as is well known, are particularly damaging to vinyl flooring, upholstery, tablecloths and the like. Standard white plasticized vinyl sheet material was stained by cigarettes, and pure pyridine borane was applied to the surface and allowed to penetrate into the sheet with the following results observed:

(1) A lighted cigarette was held very close to the vinyl sheet, producing a yellow stain, which was removed completely in 1 minute by pure pyridine borane.

(2) A smoked cigarette filter was wrapped in the vinyl sheet and oven-aged 17 hours at 60 degrees C. producing a brown stain. The stain was removed completely by pure pyridine borane in 1 minute.

(3) A burning paper match was extinguished against the vinyl sheet, producing a yellow-brown stain. This was partly removed by pure pyridine borane in 1 day.

These tests demonstrate pyridine borane is capable of fully or essentially fully removing cigarette stains from vinyl plastics; and is reasonably effective even against full-scale burns.

| Lipstick | | Stain | Stain Removal Results by Pyridine Borane | |
|---|---|---|---|---|
| Manufacturer | Shade | | 1%/24 hours | Pure |
| Coty | Compatible Red 54 | Orange | Orange | White/17 hours. |
| | Honeysuckle Pink 54 | do | Pink | White/4 days. |
| | Tangerine 56 | Deep Orange | Reddish-Orange | White/17 hours. |
| Cutex | Bold Coral | Pale Orange | Paler Orange | White/4 days. |
| | Bright Orange | Pale Yellow-Orange | Very Pale Yellow | Do. |
| | Clear Red | Pale Pink-Orange | Very Faint Orange | White/17 hours. |
| | Hot Strawberry | Pale Orange | Pale Pink/Orange | Do. |
| | Pink from Paris | Pale Violet-Orange | Pink | White/4 days. |
| DuBarry | Pink is for Girls | Pale Orange-Violet | do | White/17 hours. |
| Revlon | Certainly Red T72 | Yellow-Orange | Pink-Orange | White/4 days. |
| | Cherries ala Mode T53 | Red-Orange-Violet | Pink | Do. |
| | Fifth Avenue Red T54 | Orange | Orange | Do. |

Example 10

Standard white plasticized vinyl sheets were stained with a variety of food stains and, after washing the stained area, pure pyridine borane was spread on the surface with the following stain removal effects observed:

Example 12

Various tests were conducted on vinyl foams of different surface, pattern, and color to determine whether or not the borane stain remover would adversely affect the vinyl color. In making these tests, different vinyls were stained

| Food | Imersion | Stain | Stain Removal Results by Pyridine Borane |
|---|---|---|---|
| Tea brewed 1 bag/100 cc | 1 week | Brown-Yellow | Complete/60 minutes. |
| Coffee | 2 days | Tan | Complete/10 minutes. |
| Tomato Juice | 1 week | Faint Red-Yellow | Complete/20 minutes. |
| Tomato Sauce | do | do | Do. |
| Spaghetti Sauce | do | Deep Red-Orange | Complete/60 minutes. |
| French's Mustard | 16 hours | Bright Greenish-Yellow | Do. |
| Gulden's Mustard | do | Dull Yellow | Complete/20 minutes. | with lipstick, specifically Coty Tangerine 56. The following is a list of vinyl materials tested:

Boltaflex 200 Alpine White 2658 DCG
Boltaflex 200 Cream 2674 DCG
Boltaflex 400–L Old Gold 8156 W–M
Boltaflex 400–L Snow White 8210 W–NP
Boltaflex 400–L Medium Loden Green 9099–W–NP
Boltaflex 400–T Snow White 8755
Boltaflex 400–T Snow White 8801

In all these tests pyridine borane completely removed the lipstick stain without adversely affecting the original color of the vinyl material.

*Example 13*

Tests were conducted using a borane on vinyl and rubber floor tile. Lipstick stained floor tiles were cleaned using pure pyridine borane; the stains were completely removed in 30–40 minutes.

*Example 14*

Boranes were tested on cotton and nylon textiles stained with a blue triphenylmethane dye. While direct treatment with pure pyridine borane did not in itself remove these stains, on subsequent immersion in water a strong stain removal action occurred which removed the triphenylmethane dye stain completely, returning the materials essentially to their original appearance. There is thus an interaction between boranes and water which results in a very desirable stain removal action on fabrics.

*Example 15*

A variety of amine boranes and borohydrides was tested by applying the same in dilute 1% solutions or in pure form on stains caused by triphenylmethane dyes, ballpoint pen ink and lipstick.

ble in the polymer and/or plasticizer of the stained material. They can also be applied in vapor form or as a stain removing sheet or patch impregnated with a borane. Auxiliary means, for instance, light can be utilized to enhance the stain-removing properties of the amine boranes and borohydrides in certain environments.

What is claimed is:

1. A method of removing stains from a polymeric material including a polymer component and plasticizer component which comprises applying to the stained area a primary amine borane soluble in one of said components forming said material, for a period of time to effect removal of stains, said primary amine borane selected from the group consisting of monomethyl amine borane, monoethyl amine borane, monopropyl amine borane, monoisopropyl amine borane, monobutyl amine borane, monoisobutyl amine borane, monoethanolamine borane, benzyl amine borane, ethylenediamine borane, dodecyl amine borane and cyclohexyl amine borane.

2. A method of removing stains from a polymeric material including a polymer component and plasticizer component which comprises applying to the stained area a secondary amine borane soluble in one of said components forming said material, for a period of time to effect removal of stains, said secondary amine borane being selected from the group consisting of dimethyl amine borane, diethyl amine borane, dipropyl amine borane, diisopropyl amine borane, dibutyl amine borane, diisobutyl amine borane and diethanolamine borane.

3. A method of removing stains from a polymeric material including a polymer component and plasticizer component which comprises applying to the stained area a tertiary amine borane soluble in one of said components forming said material, for a period of time to effect removal of stains, said tertiary amine borane being selected

| Candidate Stain Removal Agent | Concentration | Stain | Location of Stain | Removal of Stain |
|---|---|---|---|---|
| Boranes: | | | | |
| Pyridine Borane | 1% in Methanol | Triphenylmethane Dye | Vinyl Sheet | Complete. |
| Dimethylamine Borane | ____do____ | ____do____ | Dye Solution | Complete, Slow. |
| t-Butylamine Borane | ____do____ | ____do____ | Vinyl Sheet | Complete. |
| Callery Alamine 336 Borane | 100% | Lipstick | ____do____ | Partial/2 weeks. |
| Borohydrides: | | | | |
| Metal Hydrides Hydriquat B-8 Tricapryl Methyl Ammonium Borohydride. | 100% | {Blue Ballpoint Pen Ink<br>{Lipstick | ____do____<br>____do____ | Complete/2 weeks.<br>Partial/2 weeks. |
| Sodium Borohydride | 5% in Isopropanol | {Blue Ballpoint Pen Ink<br>{Lipstick | ____do____<br>____do____ | Do.<br>Poor/2 weeks. |

The polymeric materials from which stains can be removed, in accordance with the present invention, can be selected from a wide group including, by way of illustration, polystyrenes, acrylic resins such as polymethyl methacrylate, polyvinylidene chloride, cellulose acetate, cellulose acetate-butyrate, polyvinyl acetate, polyvinyl chloride-acetate copolymers, and the like. The invention is especially useful for the removal of stains from vinyl plastics or resins generally, and particularly from polyvinyl chloride resins and plastics.

From the over-all standpoint of versatility and effectiveness, pyridine borane is the amine borane of choice. Other amine boranes while, to be sure, are useful for the purposes of the present invention, are, generally speaking, at least in relation to the numerous tests which were run, somewhat slower or less complete in their action. They are not only generally useful but, in relation to particular stains, may be even more effective than pyridine borane. The borohydrides are also effective although, generally speaking, slower and less complete in their stain-removing action than pyridine borane.

In summary, it will be seen that this invention relates to the removal of stains from a number of materials and is particularly useful where the stains have migrated into the body of plasticized polymeric material. Such stains can be removed using boranes and borohydrides advantageously either applied in liquid form, or in solution solufrom the group consisting of trimethyl amine borane, triethyl amine borane, tripropyl amine borane, triisopropyl amine borane, tributyl amine borane and triisobutyl amide borane.

4. A method of removing stains from a polymeric material which comprises applying to the stained area a heterocyclic material soluble in the polymer forming said material, for a period of time to effect removal of stains, said heterocyclic material selected from the group consisting of pyridine borane, methyl pyridine borane, dimethyl pyridine borane, ethyl pyridine borane, diethyl pyridine borane, propyl pyridine borane, isopropyl pyridine borane and butyl pyridine borane.

5. A method of removing stains from a plasticized polymeric material which comprises applying to the stained area a heterocyclic material soluble in at least the plasticizer component of said material, for a period of time to effect removal of stains, said heterocyclic material selected from the group consisting of pyridine borane, methyl pyridine borane, dimethyl pyridine borane, ethyl pyridine borane, diethyl pyridine borane, propyl pyridine borane, isopropyl pyridine borane and butyl pyridine borane.

6. A method of removing stains from a polymeric material including a polymer component and a plasticizer component which comprises applying to the stained area a borohydride soluble in at least one of said components forming said material, for a period of time to effect removal of stains, said borohydride selected frm the group consisting of sodium borohydride, potassium borohydride and lithium borohydride.

7. A method of removing stains from a polymeric material including a polymer component and a plasticizer component which comprises applying to the stained area a borohydride soluble in at least one of said components forming said material, for a period of time to effect removal of stains, said borohydride being selected from the group consisting of tetramethyl ammonium borohydride, tetraethyl ammonium borohydride, tetra-isopropyl ammonium borohydride and benzyl trimethyl ammonium borohydride.

8. A method of removing subsurface stains from a polymeric material which comprises plasticizing a polymeric sheet material with a pyridine amine borane, placing the plasticized sheet material in surface-to-surface contact with the stained area of said material, and maintaining said contact for sufficient time to enable the pyridine amine borane to migrate into said material and to react with the staining matter.

9. A stain remover for polymeric materials comprising a vinyl sheet material impregnated with a primary amine borane selected from the group consisting of monomethyl amine borane, monoethyl amine borane, monopropyl amine borane, monoisopropyl amine borane, monobutyl amine borane, monoisobutyl amine borane, monoethanolamine borane, benzyl amine borane, ethylenediamine borane, dodecyl amine borane and cyclohexyl amine borane.

10. A stain remover for polymeric materials comprising a vinyl sheet material impregnated with a secondary amine borane selected from the group consisting of dimethyl amine borane, diethyl amine borane, dipropyl amine borane, diisopropyl amine borane, dibutyl amine borane, diisobutyl amine borane and diethanolamine borane.

11. A stain remover for polymeric materials comprising a vinyl sheet material impregnated with a tertiary amine borane selected from the group consisting of trimethyl amine borane, triethyl amine borane, tripropyl amine borane, triisopropyl amine borane, tributyl amine borane and triisobutyl amine borane.

12. A stain remover for polymeric materials comprising a vinyl sheet material impregnated with a heterocyclic material selected from the group consisting of pyridine borane, methyl pyridine borane, dimethyl pyridine borane, ethyl pyridine borane, diethyl pyridine borane, propyl pyridine borane, isopropyl pyridine borane and butyl pyridine borane.

13. A stain remover for polymeric materials comprising a vinyl sheet material impregnated with a borohydride selected from the group consisting of sodium borohydride, potassium borohydride and lithium borohydride.

14. A stain remover for polymeric materials comprising a vinyl sheet material impregnated with a borohydride selected from the group consisting of tetramethyl ammonium borohydride, tetraethyl ammonium borohydride, tetra-isopropyl ammonium borohydride and benzyl trimethyl ammonium borohydride.

15. A stain remover for polymeric materials comprising a vinyl chloride polymer impregnated with pyridine borane.

16. A stain remover for polymeric materials comprising a vinyl chloride polymer impregnated with a borane corresponding to the formula:

$$MBH_4$$

where M is a member selected from the group consisting of alkali metals and tetramethyl, tetraethyl, tetra-isopropyl, and benzyl trimethyl ammonium radicals.

No references cited.

SAMUEL H. BLECH, *Primary Examiner.*

LEON D. ROSDOL, *Examiner.*

S. E. DARDEN, *Assistant Examiner.*

UNITED STATES PATENT OFFICE
CERTIFICATE OF CORRECTION

Patent No. 3,296,144                      January 3, 1967

Roy A. White

It is hereby certified that error appears in the above numbered patent requiring correction and that the said Letters Patent should read as corrected below.

Column 2, lines 15 and 16, for "monoethyl" read -- monomethyl --; column 5, in the third table, heading to the second column, for "Imersion" read -- Immersion --; column 8, line 52, for "amide" read -- amine --; column 9, line 2, for "frm" read -- from --.

Signed and sealed this 18th day of February 1969.

(SEAL)
Attest:

Edward M. Fletcher, Jr.                      EDWARD J. BRENNER
Attesting Officer                             Commissioner of Patents